United States Patent [19]

Augustine

[11] 4,456,911

[45] Jun. 26, 1984

[54] FREQUENCY MODULATED CONTINUOUS WAVE ALTIMETER

[75] Inventor: C. F. Augustine, Ann Arbor, Mich.

[73] Assignee: Microwave Sensors, Inc., Ann Arbor, Mich.

[21] Appl. No.: 198,600

[22] Filed: Oct. 20, 1980

[51] Int. Cl.³ .............................................. G01S 13/04
[52] U.S. Cl. ............................ 343/5 PD; 343/5 DD; 343/12 A; 343/14
[58] Field of Search .............. 343/5 PD, 5 DD, 12 A, 343/14

[56] References Cited

U.S. PATENT DOCUMENTS

| | | | |
|---|---|---|---|
| 3,343,164 | 9/1967 | Clarke | 343/12 A X |
| 3,772,697 | 11/1973 | Ross . | |
| 3,806,941 | 4/1974 | Cheal . | |
| 3,836,960 | 9/1974 | Gehman et al. . | |
| 3,886,549 | 5/1975 | Cheal et al. . | |
| 3,932,871 | 1/1976 | Foote . | |
| 4,044,354 | 8/1977 | Bosher et al. | 343/14 |

OTHER PUBLICATIONS

Regineld Hansford, "Radio Aids To Civil Aviation", pp. 274–284, published by Heywood, London, England.

Capt. Grayson Merrill, "Airborne Radar", pp. 310–321, published by D. Van Nostrand Co., Inc.

Primary Examiner—T. H. Tubbesing
Attorney, Agent, or Firm—Harness, Dickey & Pierce

[57] ABSTRACT

A frequency modulated continuous wave altimeter and method of detecting the presence of an object in a predetermined area. The altimeter is generally comprised of an antenna for receiving and radiating microwave energy, a transmitter for generating frequency modulated microwave energy, a mixer for generating a sinusoidal resulting signal from the communication of transmitted and reflected microwave energy, and a receiver for processing the resulting signal and generating an output signal indicative of distance. The transmitter includes a Gunn diode for generating a carrier signal, modulating means for varying the frequency of the carrier signal, and a high frequency oscillator for impressing a tone on the modulating means. The receiver includes multiple staged amplifiers tuned to the frequency of the tone for selectively amplifying the resulting signal, a detector for generating a signal responsive to the inflection points on the sinusoidal resulting signal, and a counter for generating an output indicative of distance from the number of inflection points detected.

12 Claims, 9 Drawing Figures

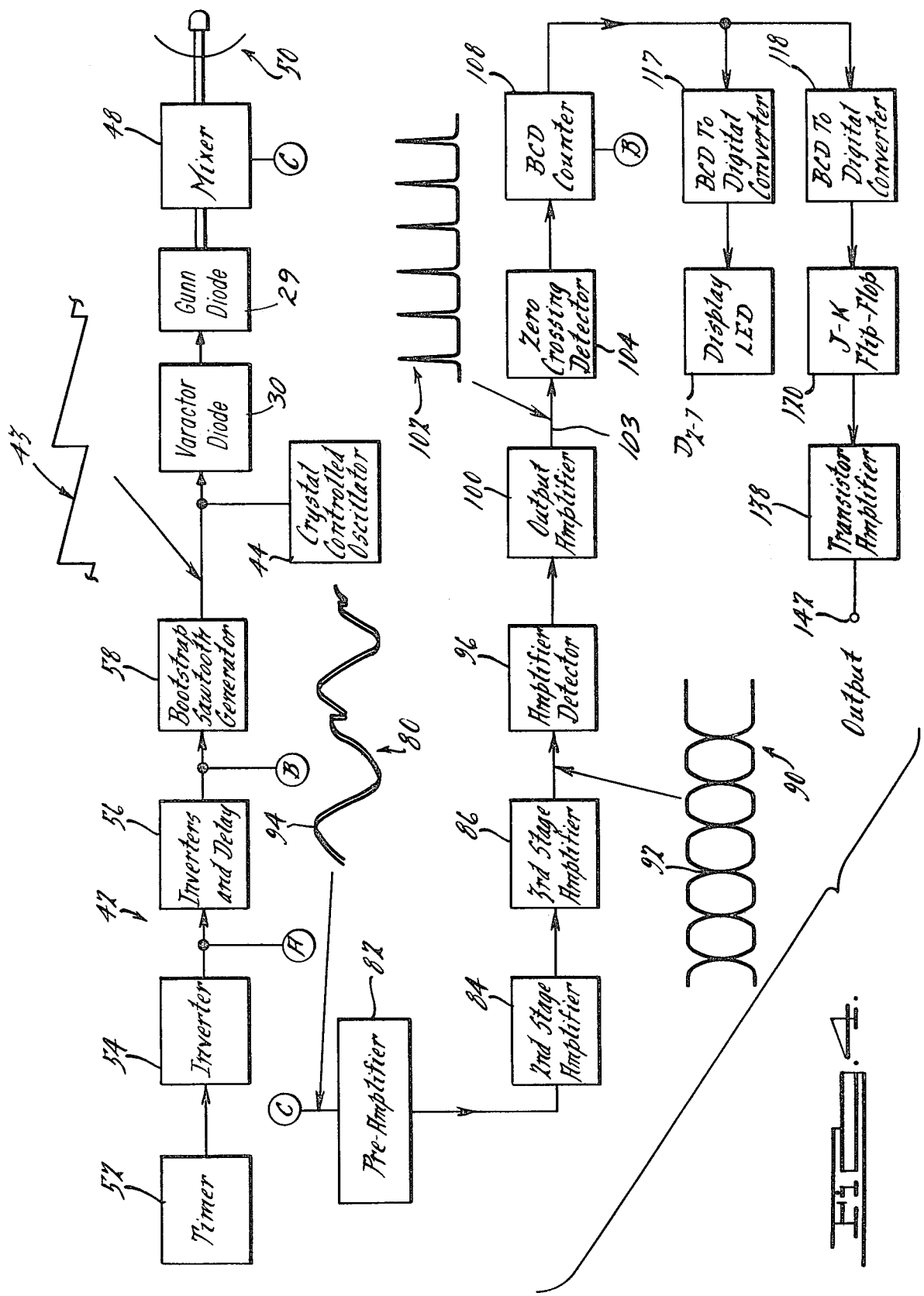

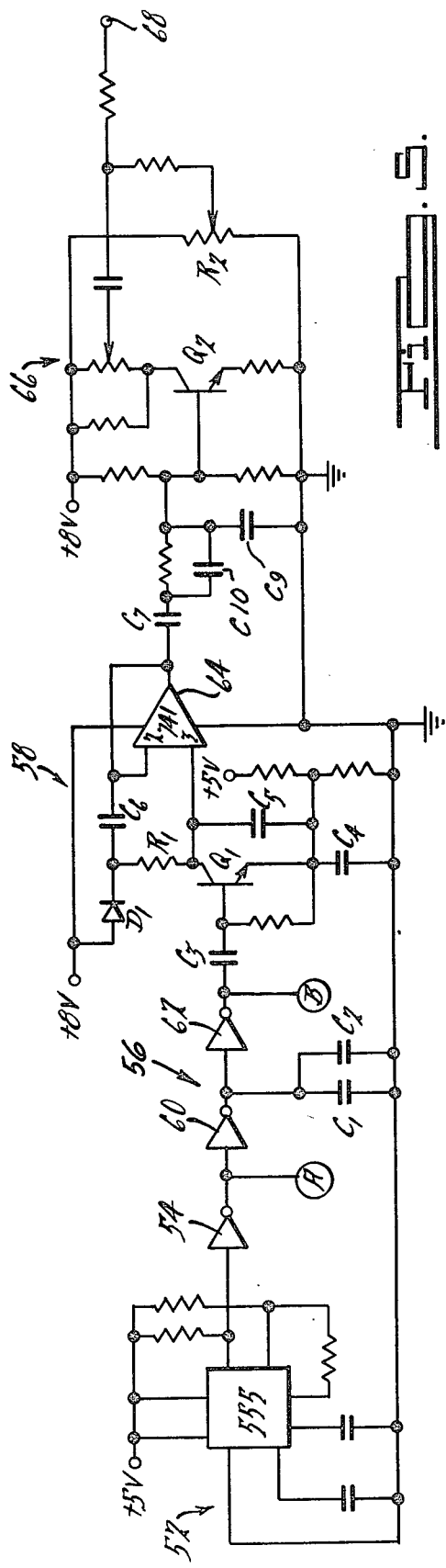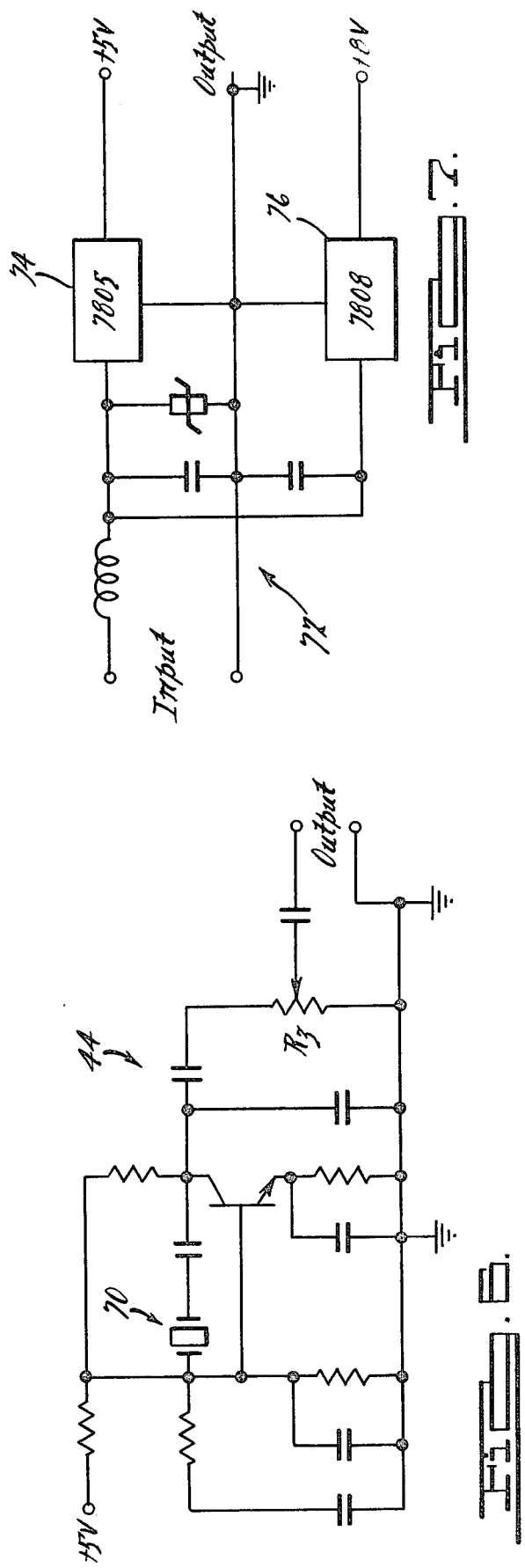

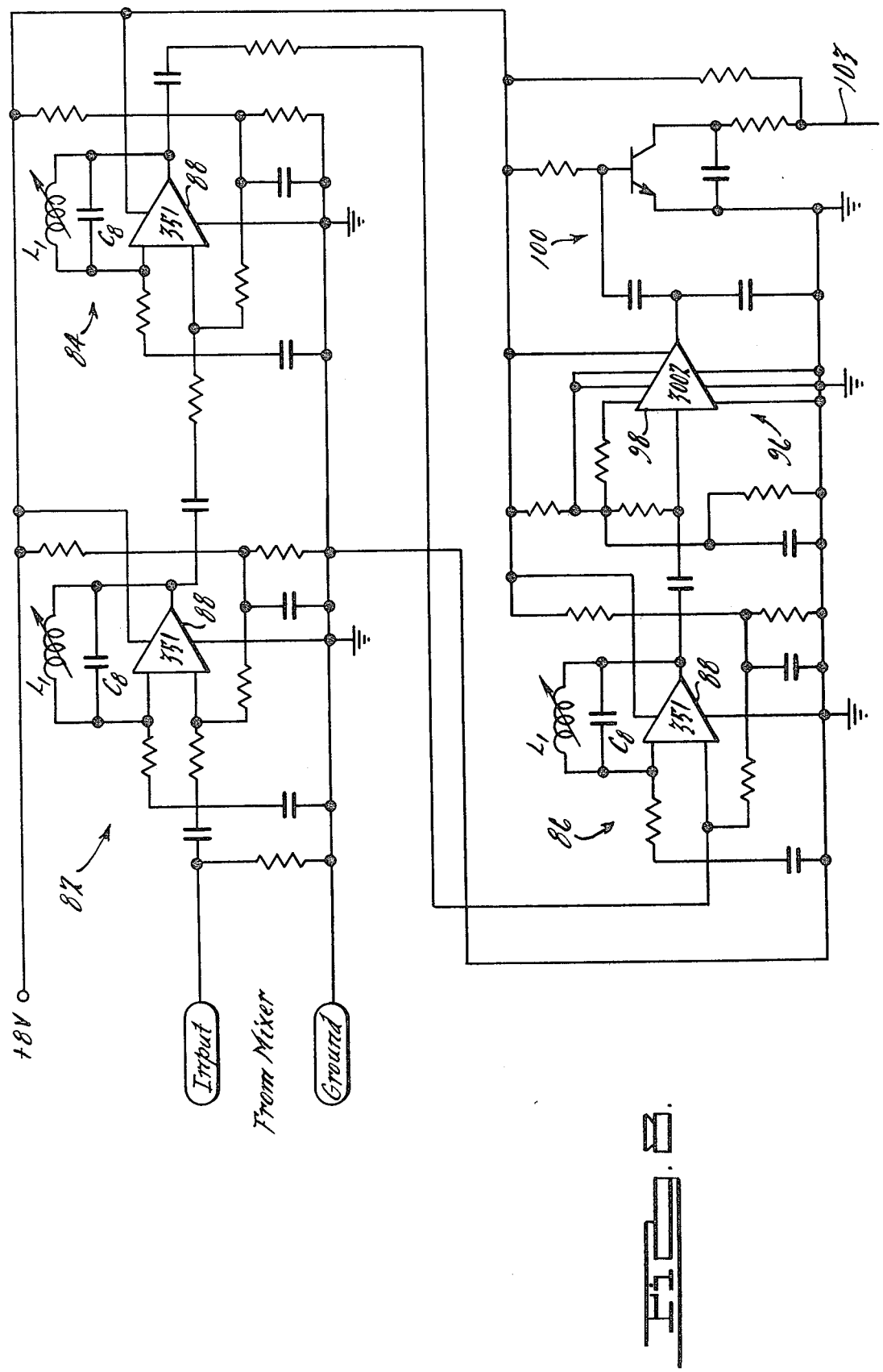

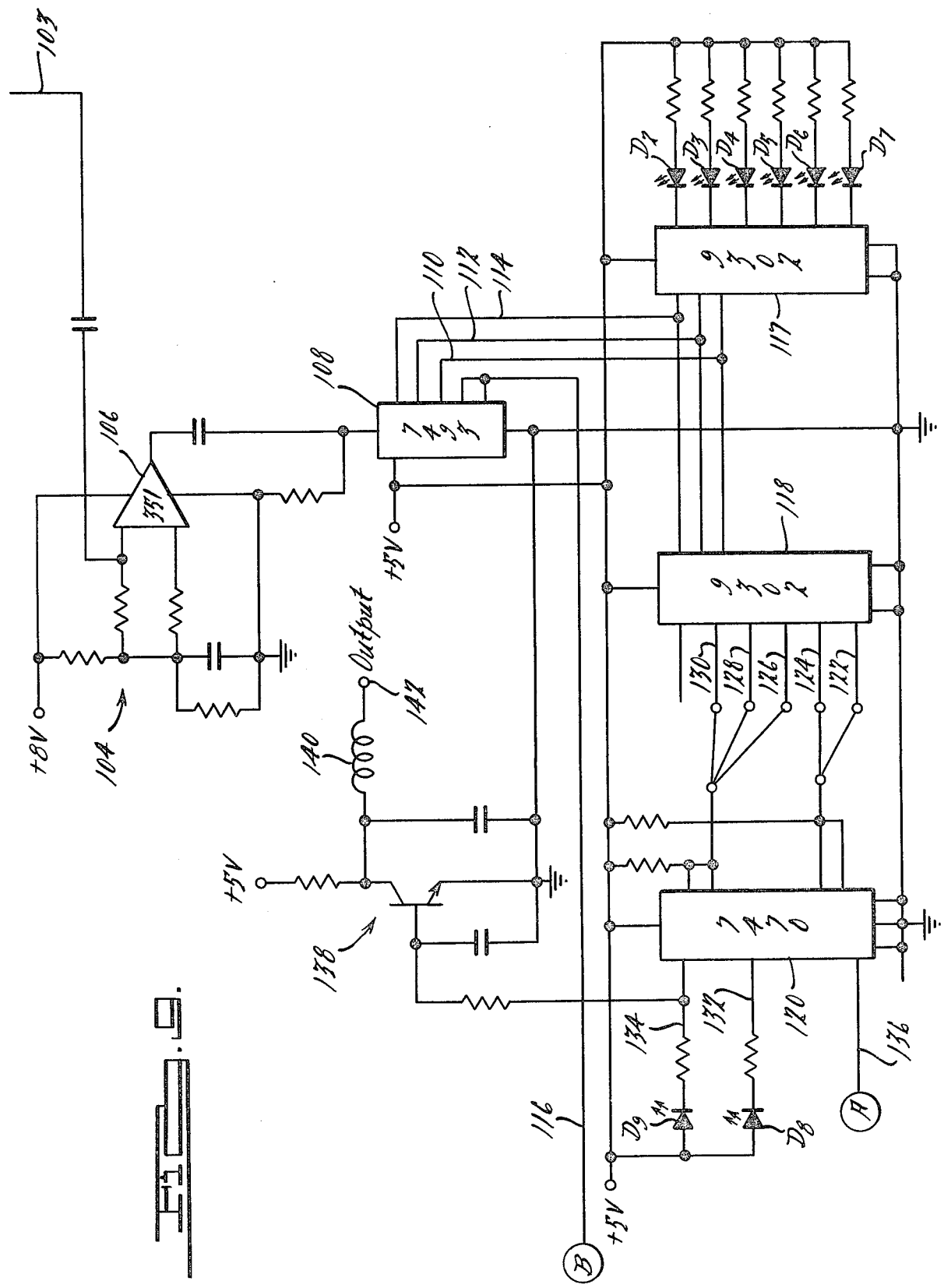

FREQUENCY MODULATED CONTINUOUS WAVE ALTIMETER

BACKGROUND AND SUMMARY OF THE INVENTION

The present invention relates generally to microwave radar altimeters, and particularly to frequency modulated continuous wave radar altimeters.

Prior frequency modulated continuous wave (FM/CW) altimeters generally have been comprised of an antenna for radiating and receiving microwave energy, a transmitter for generating a frequency modulated carrier signal, a mixer coupled between the antenna and transmitter for generating a resulting signal from the combination of the transmitted and reflected microwave signals, and receiver circuitry for processing the resulting signal into a signal indicating the distance between the antenna and a target. The frequency of the carrier signal is changed linearly with time, and transmitted through the antenna to a target. When the signal reaches the target, a portion of it is reflected back to the antenna. By the time the signal is reflected back to the antenna, the transmitter has advanced the frequency of the carrier signal to some higher value. The reflected (lower frequency) signal and the presently transmitted (higher frequency) signal combine in the mixer to produce a resulting signal. This resulting signal is typically a function of the frequency difference between the reflected and transmitted signals. This frequency difference is a measure of the time needed for the signal to travel between the antenna and target, and thus may be related to distance travelled.

Part 15 of the Federal Communication Commission's regulations for motion detectors permits the use of transmitters with a carrier frequency of 10.525 gigahertz (Ghz) and a maximum frequency deviation of plus/ minus 25 megahertz (Mhz). This deviation in frequency, or modulation, determines the resolution of altimeter. Generally, the greater the permissible frequency deviation, the greater will be the accuracy or resolution of the altimeter. Thus, the maximum permissible frequency deviation is an extremely important factor when an altimeter requires resolution between relatively small distances.

If a frequency excursion or deviation of 40 Mhz is employed, a single sinusoidal cycle will emanate from the mixer (i.e., the resulting signal for each sweep in modulation) when the distance between the antenna and target is approximately 12.3 feet. This distance corresponds to one half the wavelength for the frequency excursion of 40 Mhz. If the target is 15.38 feet from the antenna, the mixer will produce a sinusoid one and one quarter cycles in length for each sweep. Thus, as the distance is increased, a longer sinusoidal signal will result from the mixer. The logical technique for processing this signal into a digital indication of distance is to count zero crossings. Thus, every time the resulting signal from the mixer crosses zero, a signal would be produced which could be readily counted. In the case where a 40 Mhz excursion is employed, the resulting signal would cross zero approximately every 6 feet.

The above technique is considered to be the most logical because zero crossings are very sharply defined, and in a distance measuring device such sharply defined points would be necessary for accuracy. However, there is an inherent problem with this technique when resolution within a few feet is required. This problem is due in part to the fact that the starting point of the resulting signal from the mixer is unknown or uncertain. For instance, if the distance between the antenna and target is 15.38 feet, then a sinusoid 1.25 cycles in length will result from the mixer in all cases. However, the sinusoid need not start at 0 degrees, and may begin at 30 degrees, 52 degrees, 84 degrees, 90 degrees, and so on. The exact beginning and ending of the sinusoidal resulting signal is determined by the position of the antenna with respect to the target in terms of multiples of half wavelengths at the carrier frequency. The consequence of this uncertainty in the starting point is that the number of zero crossings is affected. For example, when the distance from the antenna to the target is between 6 and 12 feet, the number of zero crossings counted would be either 1 or 2 (assuming a 40 Mhz frequency modulation). Likewise, when the distance is between 12 and 18 feet, the count would be either 2 or 3, and so forth. Consequently, if the zero crossing detector produces a 2 count, the target could be anywhere between 6 and 18 feet from the antenna. When the distance from the antenna to the target is less than 6 feet, there is an additional problem. At this distance, the count should be either 0 or 1. However, because of the symmetry present when the mixer output is a sinusoid less then 0.5 cycles in length, a zero crossing detector would produce 2 counts.

In order to increase the close range accuracy of an altimeter, a different counting technique is employed according to the present invention. In particular, the inflection points on the sinusoidal signal resulting from the mixer are counted rather than zero crossing points. The inflection points occur when the slope of the sinusoidal waveform changes from plus to minus and from minus to plus. When an inflection point counting technique is employed, the count will always be either zero or one when the distance being measured is within 6 feet. However, there is a difficulty with this approach, and that is that the inflection points are not sharply defined.

To solve this problem, the transmitter and receiver according to the present invention were designed to take advantage of the fact that the slope is zero at an inflection point. In particular, a double modulation technique is employed in the transmitter. The transmitter is generally comprised of a Gunn diode for generating a carrier signal, a varactor diode for modulating the frequency of the carrier signal, and a high frequency oscillator for impressing a tone upon the sawtooth voltage waveform input to the varactor diode. Thus, the high frequency oscillator modulates the means modulating the carrier signal. With this arrangement, the resulting signal from the mixer becomes effectively two identical sinusoidal waveforms displaced slightly in time by the high frequency tone. However, at the inflection points the sinusoids meet, because there is no modulation at the zero slope. With the receiver according to the present invention tuned to amplify only the high frequency tone, the output of the amplifier will be zero at each inflection point. This then creates a sharply defined point which may be readily counted.

BRIEF DESCRIPTION OF THE DRAWINGS

FIG. 4 is a block diagram of the transmitter and receiver circuitry of the frequency modulated continuous wave altimeter according to the present invention.

FIG. 5 is a circuit diagram of the circuitry used to generate the sawtooth waveform shown in FIG. 4.

FIG. 6 is a circuit diagram of the crystal controlled oscillator shown in FIG. 4.

FIG. 7 is a circuit diagram of the power supply for the frequency modulated continuous wave altimeter of the present invention.

FIG. 8 is a circuit diagram of the amplifier circuitry shown in FIG. 4.

FIG. 9 is a circuit diagram of the detector and counting circuitry shown in FIG. 4.

DESCRIPTION OF THE PREFERRED EMBODIMENT

Figure 1:
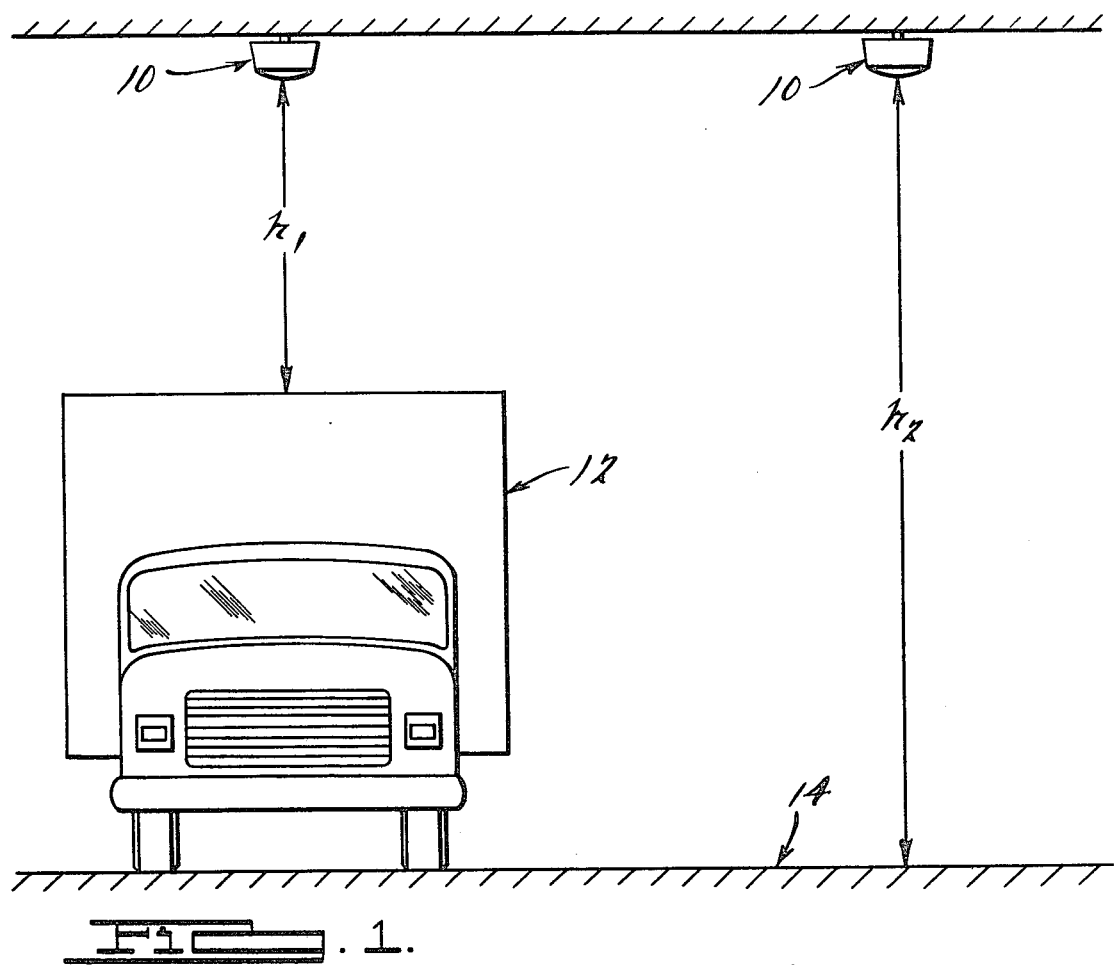
FIG. 1 is a front elevation view of a frequency modulated continuous wave altimeter according to the present invention used to determine the presence of a vehicle in a parking bay.

Referring to FIG. 1, an illustration is shown of one application for the FM/CW altimeter according to the present invention. In this application, the altimeter 10 is used to determine whether or not a vehicle, such as truck 12, is present in a parking bay. When the truck is in the parking bay, the distance between the altimeter and the top of the truck is designated as "$h_1$". Likewise, when the truck is not present, the distance between the altimeter and the ground 14 is designated as "$h_2$". Thus, the altimeter must have sufficient resolution to distinguish between heights $h_1$ and $h_2$ to determine if the truck is present.

Figure 2:
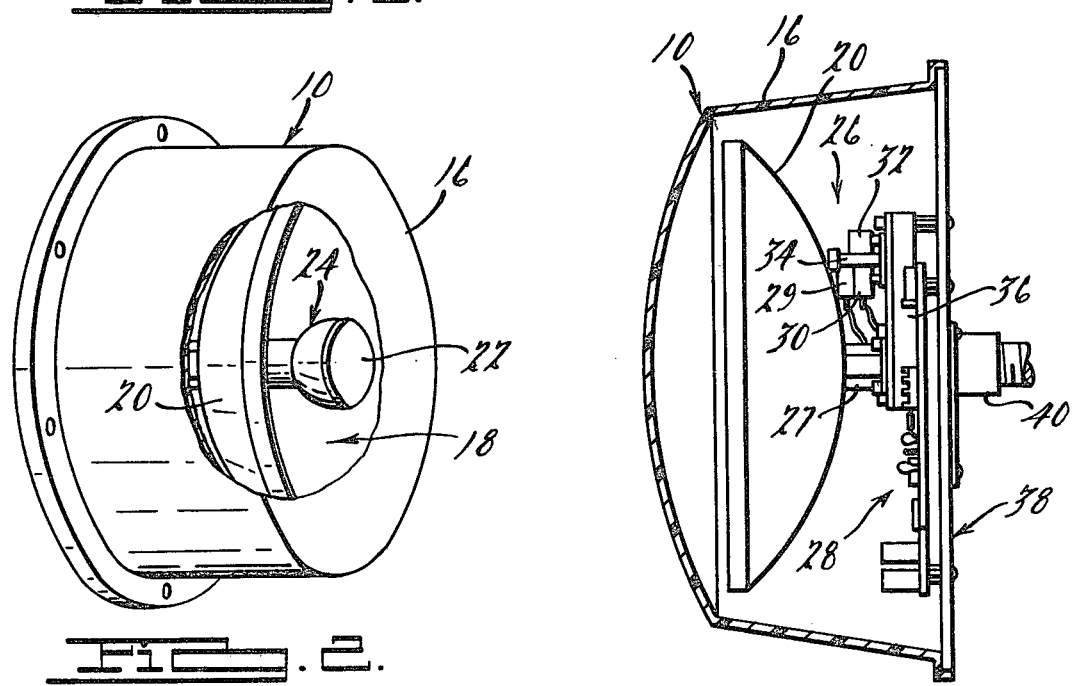
FIG. 2 is a perspective, partially cutaway, illustration of the antenna assembly of the present invention.

Referring to FIG. 2, altimeter 10 is illustrated as having a radome 16 which is shown partially cut away so as to illustrate an antenna assembly 18 which essentially comprises a parabolic dish 20 and a splash plate 22. The splash plate is shown in exaggerated thickness for illustrative purposes. The splash plate is fixedly supported with respect to the reflector by a high density dielectric support member 24.

Figure 3:
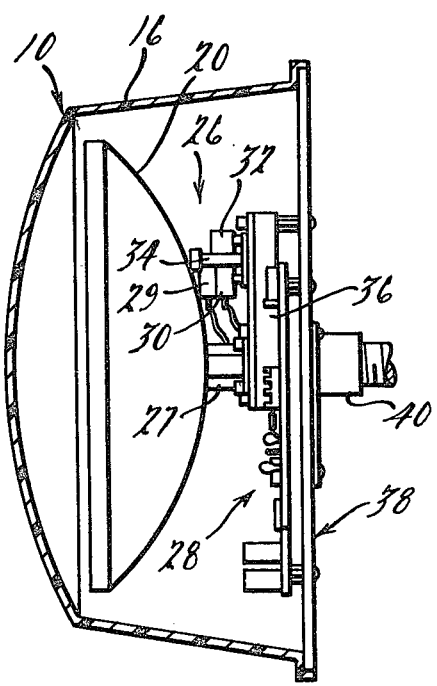
FIG. 3 is a side view, partially in elevation and partially in cross-section, of the altimeter shown in FIGS. 1 and 2.

Referring to FIG. 3, altimeter 10 is seen to additionally comprise a transmitter 26, a mixer 27, and a transmitter/receiver circuit section 28. Transmitter 26 includes a Gunn diode 29, a varactor diode 30, and a tuning slug 32 for the cavity 34. The Gunn diode is used to generate a carrier signal with a frequency of 10.525 Ghz. The varactor diode is used to modulate the frequency of the carrier signal over a plus/minus 20 Mhz range for a total bandwidth of 40 Mhz. Coupled between transmitter cavity 34 and mixer 27 is a second harmonic filter 36. The microwave energy generated by transmitter 26 is transmitted to the splash plate 22 through filter 36, mixer 27, and dielectric support member 24, where it is reflected to the dish reflector 20. Altimeter 10 is also provided with a base plate 38, which is in sealing engagement with the radome 16, and a pedestal 40 for suitably mounting the altimeter in the desired location.

With a total frequency excursion of 40 Mhz for each sweep in modulation, a single sinusoidal cycle will emanate from the mixer 27 when the distance between the antenna and target is approximately 12.3 feet. Thus, if height $h_2$ in FIG. 1 was 15.38 feet, a signal 1.25 cycles in length would result from the mixer. For this distance there will be either 2 or 3 inflection points or zero crossings, depending upon the starting point in the mixer resulting signal. Assuming that the height of the truck 12 is less than 8 feet, neither counting technique could accurately determine the presence or absence of the truck. This is because height $h_1$ would be in excess of 6 feet, and this would produce a count of 1 or 2 (inflection points or zero crossings). Since a count of 2 is common to both heights $h_1$ and $h_2$, it would not be certain which height was represented. However, if the height of the truck were such that $h_1$ would be less than 6 feet, an inflection point counting technique could be employed to determine the presence/absence of the truck. This is because the count would be either 0 or 1 when the truck is present and 2 or 3 when the truck is absent. A zero crossing count could not be used in this case because a count of 0, 1, or 2 is possible at this distance. Consequently, it may be appreciated by one skilled in the art that the relative distances to be sensed by the altimeter, as well as the closest distance, are important considerations in the design of the altimeter. It may also be appreciated that horizontal distances may be employed, as well as vertical distances, when an altimeter is utilized as a presence indicator.

Referring to FIG. 4, a block diagram is shown of the transmitter and receiver circuitry for the altimeter according to the present invention. The transmitter circuitry comprises a sweep circuit, generally designated at 42, for generating a repeating sawtooth waveform, a crystal controlled oscillator 44 for generating a 1 Mhz tone, the gunn diode 29 for generating a carrier signal, and the varactor diode 30 for modulating the frequency of the carrier signal. This signal frequency modulated carrier is then transmitted to a mixer 48, and radiated into a predetermined area by antenna 50.

Sweep circuit 42 generally includes a timer 52, inverter 54, inverter and delay 56, and a bootstrap sawtooth generator 58. The timer produces a series of negative going pulses at a frequency of 2 Khz. Referring to FIG. 5, the timer is shown to comprise a 555 timer integrated circuit and the associated capacitors and resistors controlling the frequency and shape of the pulses. A description of the 555 timer may be found in the Handbook of Components for Electronics, McGraw-Hill Book Co., 1977, pgs. 3–35 and 36. Inverter 54 inverts the pulses to provide a positive going waveform. Inverters and delay block 56 is shown to comprise inverters 60 and 62, and capacitors $C_1$ and $C_2$ which are used to delay the pulses approximately one tenth of a pulse width. The purpose of this delay and the provision for taps A and B will be more fully described in conjunction with the receiver circuitry. A capacitor $C_3$ is connected to the output of inverter 62, and is used to differentiate the delayed positive going pulses. This capacitor is connected to the bootstrap sawtooth generator 58, which is used to generate sawtooth waveform 43. The bootstrap sawtooth generator includes transistor $Q_1$, an operational amplifier 64, diode $D_1$, resistor $R_1$, and capacitors $C_4$, $C_5$ and $C_6$. The positive spike from capacitor $C_3$ turns $Q_1$ on, which discharges capacitor $C_5$. Transistor $Q_1$ then turns off, and capacitor $C_5$ is again charged up through diode $D_1$ and resistor $R_1$. This gives an increasing potential at pin 3 of operational amplifier 64, which provides the sawtooth waveform output. In order to increase the gain of the sawtooth waveform, an amplification stage 66 is provided through coupling capacitor $C_7$. This stage includes transistor $Q_2$, and capacitors $C_9$ and $C_{10}$. These capacitors are used to sharpen up the waveform. The output of the amplifier stage, designated at 68, is a negative going sawtooth waveform, which is connected to the varactor diode. Potentiometer $R_2$ provides a D.C. bias to maintain the sawtooth waveform below zero volts. Also connected to the varactor diode is the output of the crystal controlled oscillator 44. This is a Pierce oscillator, and the circuit is shown in FIG. 6. The oscillator includes a 1 Mhz crystal 70, and a potentiometer $R_3$ for modifying the amplitude of the tone generated.

Referring to FIG. 7, a power supply 72 is shown for the altimeter. The power supply includes two integrated circuit voltage regulators 74 and 76. The output of the power supply provides two positive voltages, namely five and eight volts.

Referring again to FIG. 4, the receiver circuitry receives the resulting signal from the mixer at tap C. If an oscilloscope was connected to the output of the mixer, a sinusoidal waveform will be displayed. For instance, if the distance between the altimeter and the object reflecting the microwave energy is 15.38 feet, a waveform such as sinusoidal waveform 80 may be seen on the oscilloscope display. The waveform would appear to be fuzzy, or as two sinusoids displaced slightly in time, due to the presence of the 1 Mhz tone. As may be appreciated by one skilled in the art, the resulting signal waveform may be modified by adjusting a tuning screw on the second harmonic filter 36 (shown in FIG. 3).

The resulting signal received from the mixer is processed through three tuned amplifier stages, namely pre-amplifier 82, second stage amplifier 84, and third stage amplifier 86. The circuitry for these amplifiers is shown in FIG. 8. These amplifiers are generally comprised of operational amplifiers 88 with tuned circuits ($L_1$ and $C_8$) in the feedback loop. These circuits are tuned for high Q at the 1 Mhz frequency of the tone generated from crystal controller oscillator 44. The output from these amplifiers is an envelope waveform, such as waveform 90 shown in FIG. 4. The envelopes are formed with cusps 92 which occur at the inflection points 94 in sinusoidal waveform 80. At these inflection points, the slope of the sinusoid is zero, and the 1 Mhz component is not detected.

The output from the third stage amplifier 86 is connected to an amplifier detector 96, which provides a signal compression of the envelope waveform 90, and produces a sharp pulse for each cusp 92 detected. The amplifier detector is shown in FIG. 8 to include an If amplifier 98, RCA CA-3002, which is capable of detecting down to zero volts. The amplifier detector is capable of detecting over a large dynamic range. This is important because the depth of the cusps may vary in practice, depending upon the distances to be measured and the reflecting characteristics of the targets. The output of the amplifier detector is connected to an ouput amplifier stage 100, which amplifies the sharp pulses. The output of this amplifier provides a series of pulses, such as indicated by waveform 102. The height of these pulses are dependent upon the depth of the cusps, and may not be uniform. The output from the amplifier (indicated at line 103) is connected to a zero crossing detector 104, which produces a pulse of uniform height for each of the amplified sharp pulses. The zero crossing detector (or threshold detector) is shown in FIG. 9 to be comprised of an operational amplifier 106, which is biased so that only a minimal voltage is required for it to switch states. The zero crossing detector is connected to a leading edge counter 108, which counts the pulses and produces a BCD code output on lines 110, 112, and 114. The counter is reset from a pulse received on line 116 at the start of each sawtooth waveform sweep. The reset pulse is provided by the sweep circuitry of FIG. 5, and is connected to the counter via tap B.

The output lines from the counter 108 are connected to two binary to digital converters 117 and 118. The converter 117 is used to drive a set of light emitting diodes, $D_2$ through $D_7$, for diagnostic purposes. The converter 117 operates such that diode $D_7$ is turned on when the count (inflection points per sweep) is zero, diode $D_6$ is turned on when the count is one, diode $D_5$ is turned on when the count is two, and so forth. Converter 118 is identical to converter 117, and it is used to drive a JK flip flop 120 through output lines 122–130. The converter operates such that line 122 switches to a high state when the count is zero, line 124 switches to a high state when the count is one, and so forth. Lines 122 and 124 are tied together as one input to flip flop 120. Likewise, lines 126–130 are tied together as the other input. Light emitting diodes $D_8$ and $D_9$ are connected to the respective output lines, 132 and 134, of the flip flop. The flip flop operates such that diode $D_8$ is turned on when the count is two, three, or four. Likewise, diode $D_9$ is turned on when the count is zero or one. Thus, if the height of truck 12 in FIG. 1 was such that distance $h_1$ would be less than 6 feet, then diode $D_9$ would turn on to indicate the presence of the truck. Likewise, diode $D_8$ would turn on to indicate the absence of the truck. The flip flop is controlled from a signal received on line 136. This line is connected to the sweep circuit of FIG. 5 via tap A. This signal is generated at the end of each sawtooth sweep. Thus, the flip flop will hold its output lines in their respective states until the end of the sweep, and then read its input lines after the count has been determined. An amplifier stage 138 is also connected to output line 134 of the flip flop. This stage is used to amplify the signal indicating that the truck is present, and transmit the signal through choke coil 140 to an output terminal 142 of the altimeter.

It will be appreciated by those skilled in the art that various changes and modifications may be made to the altimeter described in the specification without departing from the spirit and scope of the invention as defined by the appended claims. The preferred embodiment set forth above was for the purpose of illustration and was not intended to limit the invention.

I claim:

1. A frequency modulated continuous wave altimeter, comprising:
   (a) antenna means for receiving and radiating microwave energy;
   (b) transmitting means for generating frequency modulated microwave energy, including first oscillating means for generating a carrier signal, modulating means for varying the frequency of said carrier signal, and second oscillator means for impressing a tone on said modulating means;
   (c) mixer means, coupled between said antenna means and said transmitting means, for generating a resulting signal from the communication of transmitted and reflected microwave energy;
   (d) receiving means for receiving said resulting signal and generating an output signal indicative of distance, and receiving means including amplifier means, tuned to the frequency of said tone, for selectively amplifying said resulting signal, detector means for generating a signal responsive to said selectively amplified resulting signal, and counting means for generating an output indicative of distance from the number of signals generated from said detector means.

2. The frequency modulated continuous wave altimeter according to claim 1, wherein said second oscillating means includes a crystal controlled oscillator having a frequency greater than the sweep frequency of said modulating means, and less than the frequency of said carrier signal.

3. The frequency modulated continuous wave altimeter according to claim 2, wherein said crystal controlled oscillator comprises an oscillator having a frequency at least two orders of magnitude greater than the sweep frequency of said modulating means.

4. The frequency modulated continuous wave altimeter according to claim 3, wherein said modulating means includes a varactor diode in association with said first oscillating means, and circuit means for generating a linearly varying sawtooth voltage waveform input to said varactor diode.

5. The frequency modulated continuous wave altimeter according to claim 4, wherein said second oscillating means comprises means for generating a tone having an amplitude which is less than the amplitude of said sawtooth voltage waveform generated by said circuit means.

6. The frequency modulated continuous wave altimeter according to claim 1, wherein said mixing means comprises means for generating a resulting signal comprising two sinusoidal waveforms displaced in time by said tone from said oscillating means.

7. The frequency modulated continuous wave altimeter according to claim 6, wherein said amplifying means comprises a plurality of amplifier stage means for generating an envelope waveform with cusps occurring concomitantly with the inflection points on said resulting signal sinusoidal waveforms.

8. The frequency modulated continuous wave altimeter according to claim 7, wherein said detector means includes amplifier detector means for generating a signal for each of said cusps in said envelope waveform.

9. A method of detecting the presence of an object in a predetermined area using a frequency modulated continuous wave altimeter having an antenna, a transmitter, a mixer, and a receiver, the steps comprising:
(a) generating a linearly varying voltage waveform in said transmitter:
(b) generating a tone and impressing said tone on said linearly varying voltage waveform;
(c) generating a microwave carrier signal in said transmitter;
(d) frequency modulating said carrier signal in response to said linearly varying voltage waveform, such that said transmitter produces frequency modulated microwave energy;
(e) transmitting said microwave energy to said antenna through said mixer;
(f) radiating said microwave energy from said antenna into said predetermined area;
(g) receiving a portion of said microwave energy reflected from a surface in said predetermined area;
(h) generating a resulting signal from said mixer comprising two sinusoidal waveforms displaced in time by said tone, said resulting signal being indicative of a distance between said antenna and said surface reflecting said microwave energy;
(i) selectively amplifying said resulting signal at the frequency of said tone to generate an envelope waveform with cusps occuring concomitantly with the inflection points on said resulting signal; and
(j) determining the presence of said object from the number of said cusps in said envelope waveform.

10. The method according to claim 9, wherein said determining step includes the steps of:
generating a pulse signal for each of said cusps in said envelope waveform;
counting the number of said pulse signals over one sweep of said sawtooth voltage waveform; and
producing an output signal in response to the number of said pulse signals counted.

11. A frequency modulated continuous wave altimeter for determining the presence or absence of an object in a predeterminable area, comprising:
(a) antenna means for receiving and radiating microwave energy;
(b) transmitting means for generating frequency modulated microwave energy, including first oscillating means for generating a carrier signal, modulating means for varying the frequency of said carrier signal, and second oscillator means for impressing a tone on said modulating means;
(c) mixer means, coupled between said antenna means and said transmitting means, for generating a resulting signal from the communication of transmitted and reflected microwave energy;
(d) receiving means for receiving said resulting signal and generating an output signal indicative of distance, said receiving means including amplifier means, tuned to the frequency of said tone, for selectively amplifying said resulting signal, detector means for generating a signal responsive to said selectively amplified resulting signal, and counting means for generating an output indicative of the presence or absence of said object from the number of signals generated from said detector means.

12. The frequency modulated continuous wave altimeter according to claim 11, wherein said object is a vehicle.

* * * * *

UNITED STATES PATENT AND TRADEMARK OFFICE
CERTIFICATE OF CORRECTION

PATENT NO. : 4,456,911

DATED : June 26, 1984

INVENTOR(S) : Carl F. Augustine

It is certified that error appears in the above-identified patent and that said Letters Patent is hereby corrected as shown below:

Column 1, line 38, "plus/ minus" should be --plus/minus--
Page 2, lines 2 & 3,

Column 6, line 64, Claim 1, "and receiving" should be --said receiving--
Page 14, line 18, Claim 1

Column 7, line 50, Claim 9, ":" should be --;--
Page 2, line 6, Claim 9

Signed and Sealed this

Twelfth Day of March 1985

[SEAL]

Attest:

DONALD J. QUIGG

Attesting Officer     Acting Commissioner of Patents and Trademarks